(12) United States Patent
Lu et al.

(10) Patent No.: US 12,316,675 B2
(45) Date of Patent: May 27, 2025

(54) CONTENT BASED SECURITY REQUIREMENTS

(71) Applicant: International Business Machines Corporation, Armonk, NY (US)

(72) Inventors: Fang Lu, Billerica, MA (US); Jeremy R. Fox, Georgetown, TX (US); Martin G. Keen, Cary, NC (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 17/447,813

(22) Filed: Sep. 16, 2021

(65) Prior Publication Data

US 2023/0080992 A1     Mar. 16, 2023

(51) Int. Cl.
  *H04L 9/40* (2022.01)
  *G06F 21/62* (2013.01)

(52) U.S. Cl.
  CPC .......... *H04L 63/20* (2013.01); *G06F 21/6218* (2013.01)

(58) Field of Classification Search
  CPC .............................. H04L 63/20; G06F 21/6218
  See application file for complete search history.

(56) References Cited

U.S. PATENT DOCUMENTS

| | | | |
|---|---|---|---|
| 9,413,771 B2 | 8/2016 | Lim | |
| 9,734,169 B2 | 8/2017 | Redlich | |
| 10,979,461 B1 | 4/2021 | Cervantez | |
| 2012/0303558 A1 | 11/2012 | Jaiswal | |
| 2016/0057115 A1 | 2/2016 | Abuelsaad | |
| 2017/0093910 A1 | 3/2017 | Gukal | |
| 2018/0197087 A1 | 7/2018 | Luo | |
| 2018/0329733 A1* | 11/2018 | Aronov | G06F 9/4843 |
| 2019/0057210 A1* | 2/2019 | Aelkatwad | G06F 21/46 |
| 2019/0081982 A1* | 3/2019 | Breton | H04L 63/145 |
| 2019/0171846 A1* | 6/2019 | Conikee | G06F 21/577 |
| 2021/0075815 A1* | 3/2021 | dos Santos Silva | H04L 63/20 |
| 2023/0007023 A1* | 1/2023 | Andrabi | H04L 63/1425 |

FOREIGN PATENT DOCUMENTS

| | | |
|---|---|---|
| CN | 108337571 A * | 7/2018 |
| RO | 132807 A | 9/2018 |

OTHER PUBLICATIONS

"An Introduction to Microsoft Azure Information Protection—YouTube", Jun. 22, 2016, 2 pages, <https://www.youtube.com/watch?v=N9lp0m6d3G0>.

(Continued)

*Primary Examiner* — Alexander Lagor
*Assistant Examiner* — Shu Chun Gao
(74) *Attorney, Agent, or Firm* — Stephen R. Yoder

(57) ABSTRACT

Taking security actions according to calculated sensitivity levels of objects. Sensitivity levels are determined according to learned security measures taken on objects having certain content. Security actions are taken upon determining that an object in view of recently added content has an actionable sensitivity level. Additional considerations apply to baseline aspects of the object as well as ongoing changes to the baseline considerations.

15 Claims, 4 Drawing Sheets

(56) References Cited

OTHER PUBLICATIONS

"Apply a sensitivity label to content automatically", Microsoft 365 licensing guidance for security and compliance, Mar. 17, 2021, 21 pages, <https://docs.microsoft.com/en-us/microsoft-365/compliance/apply-sensitivity-label-automatically?view=o365-worldwide>.
"Quick Guide: Using Azure Information Protection to Keep Your Content Secure", Why choose Azure Information Protection | Proventeq, Mar. 20, 2019, 5 pages, <https://www.proventeq.com/blog/quick-guide-using-azure-information-protection-keep-your-content-secure>.
Araujo et al. "From Patches to Honey-Patches: Lightweight Attacker Misdirection, Deception, and Disinformation", CCS'14, Nov. 3-7, 2014, Scottsdale, Arizona, USA, Copyright 2014 ACM, 12 pages.
Ayoade et al.. "Automating Cyberdeception Evaluation with Deep Learning", HICSS, Jan. 2020, 10 pages.
Boggs et al., "Synthetic Data Generation and Defense in Depth Measurement of Web Applications*", International Workshop on Recent Advances in Intrusion Detection, Springer, Cham, 2014, 21 pages.
Brueckner et al., "Automated computer forensics training in a virtualized environment" Digital investigation 5 (2008): S105-S111, 7 pages.
Deshotels et al., "iOracle: Automated Evaluation of Access Control Policies in iOS", ASIACCS'18, Jun. 4-8, 2018, Incheon, Republic of Korea, 15 pages.

\* cited by examiner

CONTENT BASED SECURITY REQUIREMENTS

BACKGROUND

The present invention relates generally to the field of security in a computing environment, and more particularly to determining when to require a security feature or increase security requirements based on content.

A common method to limit access to a single file or a single directory, collectively referred to herein as a resource, includes applying personal credentials specific to the resource. The personal credentials are defined per resource by a user, often in advance of recording data to the resource.

Sensitive content may be recorded in a resource. Sensitive content is any information that is deemed confidential, for limited distribution, or otherwise considered to be privately known. Examples of sensitive information include: (i) personal details (e.g., identification numbers, bank/investment account details, usernames, passwords); (ii) intellectual property documents (e.g., under-preparation patent disclosures/trade secrets); (iii) results appear in scientific manuscripts under preparation; (iv) quantitative details regarding beneficiaries in will/trust documents; (v) racial/ethnic origin; (vii) political opinion; (vii) religion; (viii) health data; and/or (ix) sexual orientation.

SUMMARY

According to an aspect of the present invention, there is a method, computer program product and/or system that performs the following steps (not necessarily in the following order): (i) determining a set of characteristics associated with various sensitivity scores by analyzing characteristics of a set of objects having pre-assigned sensitivity scores; (ii) creating a rules database linking the set of characteristics with a corresponding sensitivity score and linking the corresponding sensitivity score with a set of security requirements; (iii) monitoring use of a computing system for object modification; (iv) responsive to detecting object modification, identifying an object being modified and a storage location of the object, the object having a pre-defined sensitivity score, the storage location having a pre-defined security score, and the storage location being secured according to first security protocol; (v) computing a first sensitivity score for the object during modification of the object; (vi) revising the pre-defined security score based on the first sensitivity score of the object to generate a revised security score; and (vii) responsive to the revised security score exceeding a threshold value for maintaining the first security protocol, taking a security action to modify the first security protocol.

DETAILED DESCRIPTION

Figure 1:
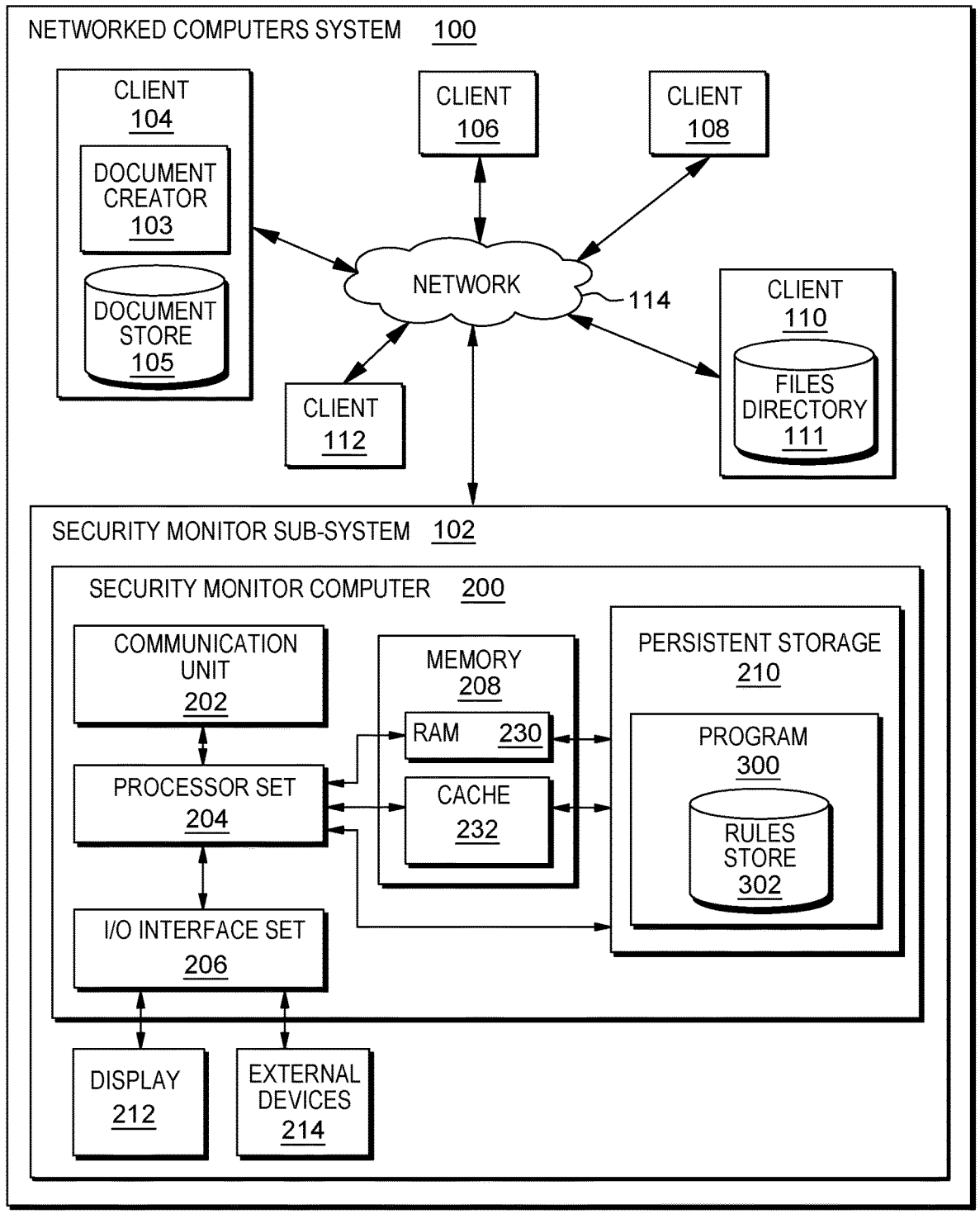
FIG. 1 is a block diagram view of a first embodiment of a system according to the present invention.

Taking security actions according to calculated sensitivity levels of objects. Sensitivity levels are determined according to learned security measures taken on objects having certain content. Security actions are taken upon determining that an object in view of recently added content has an actionable sensitivity level. Additional considerations apply to baseline aspects of the object as well as ongoing changes to the baseline considerations.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: security monitor sub-system 102; client sub-systems 104, 106, 108, 110, 112; document creator 103; document store 105; files directory 111; communication network 114; security monitor computer 200; communication unit 202; processor set 204; input/output (I/O) interface set 206; memory device 208; persistent storage device 210; display device 212; external device set 214; random access memory (RAM) devices 230; cache memory device 232; security program 300; rules store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Security monitoring program 300 operates to monitor amendments to editable objects including individual documents or other files and directories containing the documents or files. Objects may be analyzed for baseline security levels prior to monitoring amendments made and operational or historic changes to the objects. The security monitoring program observes changes to the content of objects for additional bases for taking a security action that may include requiring password protection or additional security features for the recently amended object. Other parameters may also drive the decision to take a security action such as number of persons accessing the object, frequency of access, and/or memory size of the object or file in which the object is stored.

Some embodiments of the present invention recognize the following facts, potential problems and/or potential areas for improvement with respect to the current state of the art: (i) in a typical personal computer, there could be stored a large number of files or directories that are not protected by a password or other security feature; (ii) files and directories may contain sensitive content; and/or (iii) sensitive content may be not sufficiently be protected against access even if the entire computer generally is protected by personal credentials.

Some embodiments of the present invention are directed to a mechanism that allows each file and/or a file directory to notify a user that the file or directory should be protected by a password or other security feature. For example, as a text file is being created, more and more information including what may be sensitive information is entered. Some embodiments of the present invention determine that the text file contains a collection of information that needs further security protection. An alert may be provided to the user for selection of a personal credential or an additional security feature to better protect the text file. Examples of a personal credential include: (i) password; (ii) biometric data; (iii) a temporary personal identification number (PIN) sent to a user's second device (e.g., a mobile phone); and (iv) voice profile.

Figure 2:
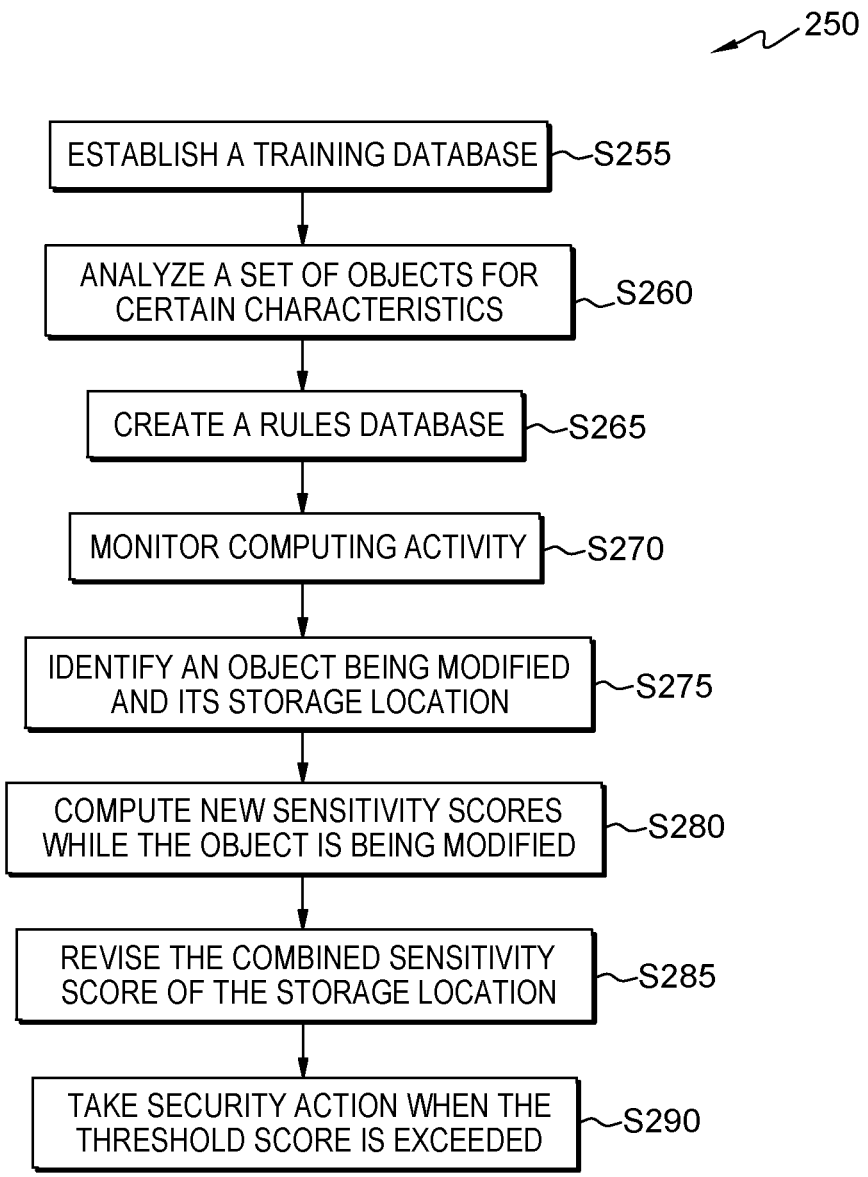
FIG. 2 is a flowchart showing a first embodiment method performed, at least in part, by the first embodiment system.
Figure 3:
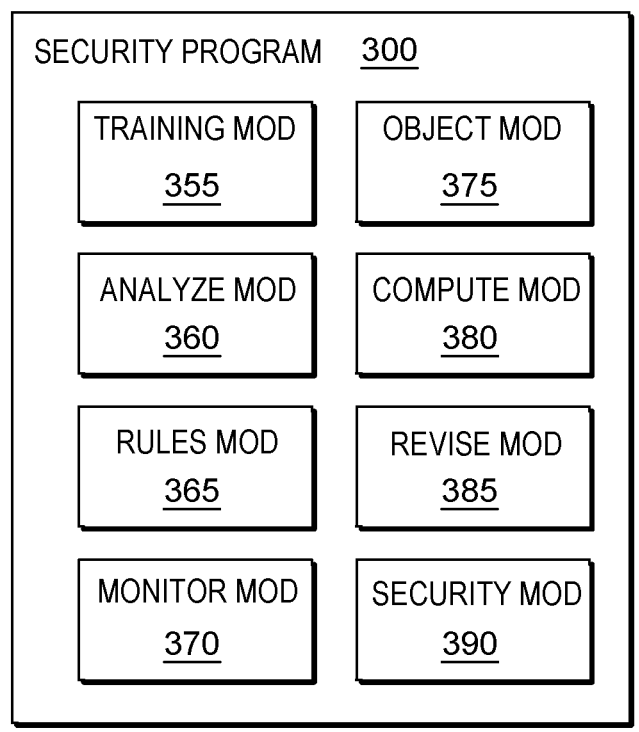
FIG. 3 is a block diagram view of a machine logic (for example, software) portion of the first embodiment system.
Figure 4:
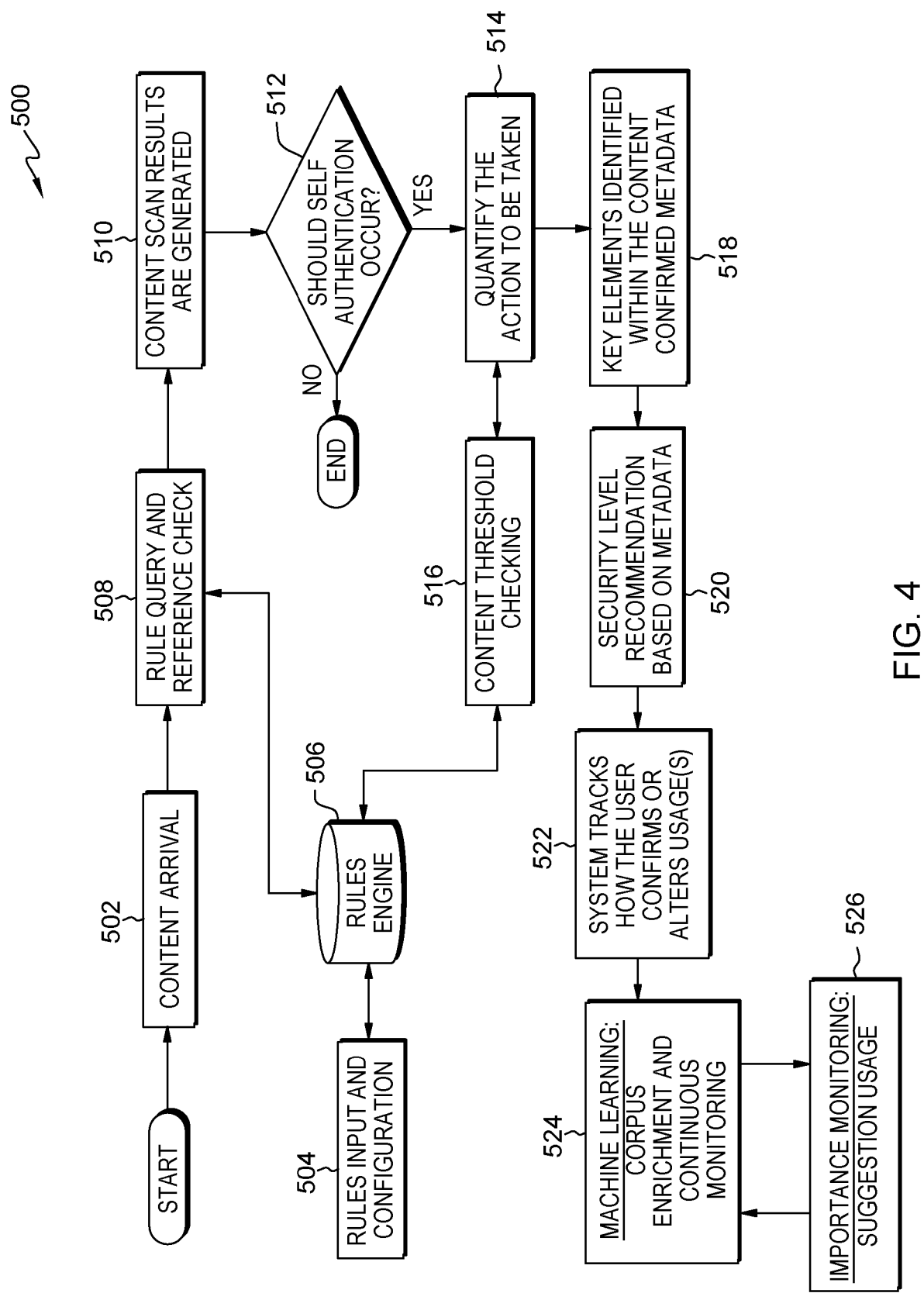
FIG. 4 is a flowchart view of a second embodiment of a method according to the present invention.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing beings at step S255, where training module ("mod") 355 establishes a training database having user-specific security requirements and sensitivity scores for objects owned by a user in participating computer systems. According to historic use or specific instructions in a user profile, user-specific preferences are collected in a training database. The training database may include several users but is arranged for training on a user specific basis. According to some embodiments of the present invention a user profile includes user-specific security requirements for specified objects or object types and/or specified characteristics of objects. Establishing a training database may include retrieving a pre-existing training database or developing a training database by collecting data for training purposes. According to some embodiments of the present invention, the training database may be retrieved in a pre-existing form and supplemented or updated with collected data.

Processing proceeds to step S260, where analyze mod 360 analyzes a set of objects owned by the user for characteristics associated with corresponding object sensitivity scores. The set of objects that are analyzed are identified in the training database. Analysis may be performed by a machine learning model to generate analysis results for use in a rules database, such as the one discussed below. Characteristics of the objects may include: (i) sets of words; (ii) sets of phrases; (iii) memory size; (iv) total number of words in an object; (v) number of times the object is accessed during a specified period of time; and/or (vi) length of time an object is stored.

Processing proceeds to step S265, where rules mod 365 creates a rules database associating, for each user, object characteristics with sensitivity scores and associating sensitivity scores with security requirements. In some embodiments of the present invention, the rules database is generated by a machine learning model having been trained on the training database. By aligning object characteristics with sensitivity scores, a new object may be processed automatically to assign a sensitivity scores according to preferences of a given user. Having appropriate sensitivity scores allows for determining security requirements according to preferences of the user. The rules database is created as the basis of performing automated assignment of security requirements for modified and new objects owned by users for which training has been performed.

Processing proceeds to step S270, where monitor mod 370 monitors computing activity of the participating computer systems for object modification. Computing activity may be monitored for a single computing system or over a networked computers system, such as networked computers system 100 (FIG. 1). For example, computing activity at client sub-system 104 is monitored for use of document creator 103 to modify document objects in document store 105. Document store includes directories in which documents are stored.

Processing proceeds to step S275, where object mod 375 identifies an object being modified and a corresponding storage location of the object. Upon detecting modification activity for an object, a storage location of the object is identified. According to some embodiments of the present invention, the storage locations being monitored are each assigned a combined security score based on objects contained within the storage locations. For example, directories holding a set of documents may be assigned a combined security score that reflects the individual sensitivity scores of the documents. Modifying one of the documents with additional text may cause the combined security score of the directory to change.

Processing proceeds to step S280, where compute mod 380 computes new sensitivity scores for the object characteristics while the object is being modified. In some embodiments of the present invention, the new sensitivity scores are computer by a machine learning model having been trained on the training database. According to some embodiments of the present invention, during modification of the object, added text elements are captured over a pre-defined length of time for computing a current sensitivity score. This process repeats until object modification is ended. Alternatively, each text element, such as a word or phrase, that is added to the object during modification is identified for processing in an on-going manner until object modification ends. New sensitivity scores are computed periodically according to the manner in which the modifications are tracked. For example, periodic computing may occur for a text document object after a specified number of words are added to the document.

Other factors may drive the combined security score of a storage location in addition to the individual sensitivity scores of the objects stored within the storage location. Factors may include: (i) percentage of free memory space; (ii) frequency of access to the storage location; (iii) number of individual users having access to the storage location; and/or (iv) number of files stored within the storage location.

Processing proceeds to step S285, where revise mod 385 revises the combined security score of the storage location in view of the new sensitivity score of the object to create a revised security score for the storage location. Periodically, a new sensitivity score for the object is used for revising the security score of the storage location. In some embodiments, each period when a new sensitivity score is computed, the new sensitivity score is communicated to the revise module for revising the combined security score. Alternatively, the new sensitivity score is continuously changing or at least changing more often than the combined security score is being revised. In that case, the revise module pulls the latest new sensitivity score periodically to revise the combined security score.

Processing proceeds to step S290, where security mod 390 takes a security action responsive to the revised security score of the storage location exceeding a threshold security score corresponding to a current security requirement for the storage location. For each storage location assigned a combined security score, there is a corresponding security requirement for a given range of combined security scores. When the revised security score exceeds the threshold at the top of the given range, a next security requirement should be implemented. In some embodiments of the present invention, a security requirement table is provided for determining the security requirement for a particular security score.

The security action to be taken may be, for example: (i) requiring password protection of the object; (ii) requiring two-step authentication to access the object; (iii) changing the frequency of required password changes; and (iv) requiring the identification of a voice profile.

III. Further Comments and/or Embodiments

Further embodiments of the present invention are discussed in the paragraphs that follow and with reference to FIG. 5.

Some embodiments of the present invention are directed to a mechanism in which each resource (a single file, directory) is scanned as content is recorded to the resource to determine if the resource may contain sensitive content. For example, as a user enters data into a spreadsheet a scan is conducted to determine whether or not additional security is needed to comply with a pre-defined policy for securing certain information. According to some embodiments, each resource on a computer system is assigned a sensitivity score to determine to what extent the resource contains sensitive content, for example in the range of levels 1 to 10, where level 1 indicates no need to protect and level 10 indicates extremely sensitive content that must be protected. Once the sensitivity score of a resource exceeds a pre-defined threshold, such as level 5, an additional mechanism prompts the user to define security credentials specific to the resource.

For example, the spreadsheet mentioned above may reach level 5 as it is being developed and the directory in which the spreadsheet is stored may reach level 7 by including the level 5 spreadsheet. Security credentials may be required for securing the directory as well as the spreadsheet.

Some embodiments of the present invention are directed to a process for rules engine pre-population and dynamic adjustment including the following operations: (i) configure the security monitoring system with the rules engine; (ii) provide for a user to reconfigure at least some of the rules and/or add rules to the rules engine (for example, the user can define the recency of bank statements that need to be secured); (iii) the rules engine addresses pre-populated rules and reconfigured rules at various levels of governance, including: a) organizational governance (security rules that apply across an entire organization); b) departmental governance (security rules that apply to a given department, product, or team such as security related to only mainframe repository content, or security specifically around the accounting department to meet regulatory compliance); and c) personalized governance (security rules specific to an individual where information that is sensitive to one individual may not be considered sensitive to another); (iv) in addition to adjusting the pre-populated rules, providing for the user to set up thresholds to secure different content based on its importance applied at the three levels of governance; and (v) the rules engine is dynamically adjusted over time in response to temporal events and/or changes in policy.

Some embodiments of the present invention are directed to a process for content scanning and analysis including the following operations: (i) the security monitoring system can identify the time/date/the original user who created the content of the document and save the metadata information for future analysis; (ii) the security monitoring system scans the content of the document to determine the core usage of the document; (iii) the security monitoring system determines the key elements that need to be secured from the content; (iv) the security monitoring system associates the key elements from the document and compares them with the pre-populated rules; and (v) the security monitoring system also cross-validates the importance of the key elements to be secured with user profile data.

Some embodiments of the present invention are directed to a process for dynamic security level allocation assignment and continual monitoring including the following operations: (i) the security monitoring system suggests the security level based on the analyzed content and the key metadata information of the document such as date/time/location the document was created and the author of the document; (ii) the security monitoring system keeps track of how the user sets up the security password based on the content of the document; (iii) the security monitoring system generates a machine learning model based on the continuously monitored user behavior; (iv) the security monitoring system integrates the machine learning model into the future security level and password suggestions; and (v) the security monitoring system can also suggest how often the password needs to be changed based on the importance of the document.

Some embodiments of the present invention are directed to a probabilistic model employing for example, logistic regression, to assign a sensitivity score for each document or directory. In one embodiment the sensitivity score is calculated as a probability between 0.0 (lowest sensitivity) to 1.0 (highest sensitivity) and is compared to a pre-defined threshold (e.g., 0.5) to classify the document. The probabilistic model may address covariates that are not obvious for use in determining a sensitivity level. These covariates may include, for example, length of document, memory size of the resource, number of times the resource is accessed, number of users accessing the resource, age of a file or files within the directory, and/or sensitive textual expressions. The expressions may be extracted by using simple text processing and/or advanced natural language processing techniques. Analyzing text may include processing one or more languages (e.g., a file may contain sensitive information in English, Spanish, or both). Additional covariates may indicate if portion(s) of the document (or it all) already appear publicly, thus affect the level of sensitivity (i.e., if indeed some of the content appear on-line then the document may be considered less sensitive).

Some embodiments of the present invention are directed to scanning and scoring documents while being developed or recorded with data to derive a sensitivity level of the content of the data recorded within the document. The sensitivity level is based upon analysis of the content with respect to governance rules, whether operational, departmental, or personalized.

Some embodiments of the present invention are directed to dynamically triggering credential definition specifications to enable security measures apposite to the derived sensitivity of the content as it is added to a given document or other resource.

FIG. 5 shows flowchart 500 depicting a second method according to an embodiment of the present invention. The process depicted in FIG. 5 may be performed on a single computer system or in a networked computers system such as networked computers system 100 by a program stored in persistent memory such as security monitoring program 300 (FIG. 1).

Processing begins at step 502, where new content is recorded to a target object. In this example, a text document is amended to include additional text so that the new content is the additional text and the target object is the text document. As discussed herein, there may be an earlier assigned sensitivity level to the target object. The earlier assigned sensitivity level is based on content in the object at the earlier time when the sensitivity level was assigned. Also, the prior sensitivity level may have been based on current characteristics that may have changed by the time new content is recorded to the document.

Processing proceeds to step 508, where rules stored in rules engine 506 and associated with the target object are queried and any earlier assigned sensitivity level is identified. As noted in the flowchart, rules are input and/or configured/reconfigured by a user at operation 504. The rules engine includes certain data about the target object and the new content including, but not limited to: (i) content origin; (ii) data currency; (iii) data urgency; (iv) data relevance; (v) data importance; and/or (vi) data workflow.

Processing proceeds to step 510, where the content of the object is scanned, and scan results are generated. The scan results indicate a sensitivity level of the target object in view of the new content and other influencing factors that may have changed. A new sensitivity level resulting from the scan results may have a value that triggers a security action.

Processing proceeds to decision step 512, where the decision is made as to whether or not to require self-authentication. Requiring self-authentication is a security action that may be taken when the sensitivity level exceeds a pre-defined threshold sensitivity level as required by rules engine 506. If the new sensitivity level is not a sufficiently high value to require a security action, processed ends. If the new sensitivity level is sufficiently high to require a security action, processing follows the YES branch to step 514.

Following the YES branch, processing proceeds to step 514, where the system quantifies the security action to be taken. As shown in the flowchart, content threshold checking 516 occurs with respect to feedback sent from the quantification step. With reference to the rules engine for threshold values, a security action is determined responsive to the current sensitivity level assigned to the target object.

Processing proceeds to step 518, where key elements are identified within content confirmed metadata.

Processing proceeds to step 520, where a security level recommendation is determined according to the metadata for the target object and the new content.

Processing proceeds to step 522, where the system tracks how the user confirms or alters usage of the recommended security level.

Processing proceeds to step 524, where the outcome of the user action is recorded in a training corpus in a corpus enrichment action based on the continuous monitoring of target object status. The training corpus is the basis for machine learning and automated evaluation of target objects for taking security actions.

Processing concludes for the target object at step 526, where object importance is monitored in view of security suggestion usage by the user as determined in step 522.

Some embodiments of the present invention are directed to more than a static rule classification by which security prompts are based.

Some embodiments of the present invention are directed to a sensitivity scoring mechanism with thresholds rather than a static rules engine. For example, a text document that contains the word "invention" in it would not trigger the need for protection alone (the sensitivity scoring would be low). But as the document is edited and additional references to inventing are added ("novelty", "reduction to practice", "prior art") these terms are classified as being related to a patent disclosure and the sensitivity score is raised. Accordingly, only when sufficient classification occurrences cause the sensitivity score to reach a pre-defined threshold, the document is a candidate for additional protection, such as requiring a password to access it.

Some embodiments of the present invention apply labels to resources for developing a probabilistic model and/or to define a sensitivity level threshold.

Some embodiments of the present invention provide for customization of sensitivity thresholds and rules driving sensitivity based upon preferences of the owner of the resource in view of organizational, departmental, and personalized governance. In that way, sensitivity-determining rules have a dynamic aspect such that they may change temporally.

Some embodiments of the present invention are directed to a self-monitoring and machine learning solution whereby the security monitoring system analyzes the resource protections applied by a user to a given document, whether in response to a prompt for added security or by independent action of the user. The security monitoring system distills classifications to a corpus of user interventions for use as a training tool for machine learning to understand the characteristics of documents a user manually protects and at what level of security the user selects. The machine learning system applies the learning to the sensitivity scoring of new resources without requiring input or action from the user.

Some embodiments of the present invention are directed to triggering security specifications for a resource according to a derived sensitivity level of content as it is recorded to a resource. The security specification may include, for example, applying a password to limit access to the resource or requiring biometric security to limit access to the resource.

Some embodiments of the present invention are directed to a process for securing files that contain sensitive content by scanning files in a filesystem for sensitive content, scoring the files based on respective levels of sensitivity (e.g., using operational, departmental, and/or governance rules), where the scoring produces an incrementally higher score for each sensitive item within a file, re-scanning and re-scoring the files as they are modified, where the re-scoring produces an incrementally higher score for each additional sensitive item within a file, and in response to determining that a score for a file exceeds a threshold, automatically triggering a security measure to secure the file.

Some embodiments of the present invention are directed to customization of the level of security, by a user, by the organization, or both.

Some embodiments of the present invention are directed to a mechanism to self-trigger an alert in real-time for a given resource when sensitive content is being typed into a file, given that a threshold has been exceeded by the added content.

Some embodiments of the present invention provide for a user to define, for a given object, the level of sensitivity threshold above which a security alert will be triggered. Further, customization may be applied to cause specific resource content to be counted or ignored for sensitivity determination Some embodiments of the present invention are directed to scoring a document based upon the sensitivity of content added to it and applying apposite security measures to protect the content.

Some embodiments of the present invention are directed to personalization of the level of security by a user and/or by the organization.

Some embodiments of the present invention are directed to more than merely scanning a network but to a mechanism to self-trigger an alert in real-time for a given resource in case sensitive content is being typed into a file, given that a threshold has been exceeded.

Some embodiments of the present invention allow for a user to, for example, define the level of sensitivity threshold above which a security alert will be triggered (e.g., alert or ignore certain personal details and/or certain numbers.

Some embodiments of the present invention do more than apply machine learning to calculate a security scores for resources but provide a unique way of adjusting thresholds in that users and/or organizations are provided a mechanism for setting security thresholds.

Some embodiments of the present invention are directed to resource self-monitoring and alerting in real-time when a security sensitivity score is exceeded.

Some embodiments of the present invention are directed to using machine learning, thresholds, and the ability to configure security levels relative to dynamically selected thresholds.

Some embodiments of the present invention may include one, or more, of the following features, characteristics and/or advantages: (i) provides for a user to reconfigure at least some of the rules and/or add rules to the rules engine; (ii) provides for a user to set up security thresholds to secure content based on its importance as applied at various levels of governance; (iii) learns how the user sets up the security password based on the content of the document; (iv) each resource on a computer system is assigned a sensitivity score to determine to what extent the resource contains sensitive content; (v) integrates a machine learning model into future security level determinations for taking appropriate security actions; (vi) provides for customization of sensitivity thresholds and rules driving sensitivity decisions; (v) provides a mechanism to self-trigger an alert in real-time for a given resource in case sensitive content is being typed into a file; and/or (vi) specific resource content may be selectively counted or ignored for sensitivity determination.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
determining characteristics of a set of objects having a first sensitivity score, the characteristics including at least one of memory size, total number of words in an object, access frequency, and storage time;
associating, from the determined characteristics, a set of characteristics of the set of objects with the first sensitivity score;
creating a rules database establishing links between object characteristics and security requirements, the rules database:
linking the set of characteristics with the first sensitivity score; and
linking the first sensitivity score with a set of security requirements;
monitoring use of a computing system for an object modification, the object modification includes adding content to the object;
responsive to detecting the object modification, identifying an object being modified by the object modification and a storage location of the object, the object having a pre-defined sensitivity score, the storage location having a pre-defined security score, and the storage location being secured according to a first security protocol based on the pre-defined security score of the storage location being below a threshold value for maintaining the first security protocol;
computing a revised sensitivity score for the object during modification of characteristics of the object;
revising the pre-defined security score of the identified storage location based on the revised sensitivity score of the object stored therein to generate a revised security score of the storage location; and
responsive to the revised security score of the storage location exceeding the threshold value, taking a security action to modify the first security protocol.

2. The method of claim 1, further comprising:
collecting user-specific preferences including the set of objects having pre-assigned sensitivity scores and user profile data; and
establishing a training dataset with the collected user-specific preferences;
wherein:
computing the revised sensitivity score is performed by a machine learning model trained on the training dataset.

3. The method of claim 1, wherein:
the set of objects is a set of text documents;
the storage location is a file system directory; and
the object modification includes adding words and phrases a text document.

4. The method of claim 3, wherein computing the revised sensitivity score includes:
determining a specified number of characters are added to the text document;
identifying text characteristics of the set of characteristics in the text document including the added words and phrases; and
determining an assigned sensitivity score corresponding to the identified text characteristics.

5. The method of claim 1, wherein the set of characteristics includes sets of words and sets of phrases.

6. The method of claim 1, further comprising:
receiving the first threshold value for maintaining the first security protocol from an administrator of the storage location.

7. The method of claim 1, wherein computing the revised sensitivity score is performed a specified duration of time after detecting the object modification.

8. The method of claim 1, wherein:
the set of objects is a set of text documents;
the target storage location is a file system directory; and
the modification of characteristics includes adding words and phrases a text document.

9. A computer system comprising:
a processor set; and
a computer readable storage medium;
wherein:
the processor set is structured, located, connected, and/or programmed to run program instructions stored on the computer readable storage medium; and the program instructions which, when executed by the processor set, cause the processor set to perform a method including:
  determining characteristics of a set of objects having a first sensitivity score, the characteristics including at least one of memory size, total number of words in an object, access frequency, and storage time;
  associating, from the determined characteristics, a set of characteristics of the set of objects with the first sensitivity score;
  creating a rules database establishing links between object characteristics and security requirements, the rules database:
    linking the set of characteristics with the first sensitivity score; and
    linking the first sensitivity score with a set of security requirements;
  monitoring use of a computing system for an object modification, the object modification includes adding content to the object;
  responsive to detecting the object modification, identifying an object being modified by the object modification and a storage location of the object, the object having a pre-defined sensitivity score, the storage location having a pre-defined security score, and the storage location being secured according to a first security protocol based on the pre-defined security score of the storage location being below a threshold value for maintaining the first security protocol;
  computing a revised sensitivity score for the object during modification of characteristics of the object;
  revising the pre-defined security score of the identified storage location based on the revised sensitivity score of the object stored therein to generate a revised security score of the storage location; and
  responsive to the revised security score of the storage location exceeding the threshold value, taking a security action to modify the first security protocol.

10. The computer system of claim 9, further causing the processor to perform a method including:
  collecting user-specific preferences including the set of objects having pre-assigned sensitivity scores and user profile data; and
  establishing a training dataset with the collected user-specific preferences;
wherein:
  computing the revised sensitivity score is performed by a machine learning model trained on the training dataset.

11. The computer system of claim 9, wherein:
  the set of objects is a set of text documents;
  the storage location is a file system directory; and
  the object modification includes adding words and phrases a text document.

12. The computer system of claim 11, wherein computing the revised sensitivity score includes:
  determining a specified number of characters are added to the text document;
  identifying text characteristics of the set of characteristics in the text document including the added words and phrases; and
  determining an assigned sensitivity score corresponding to the identified text characteristics.

13. The computer system of claim 9, wherein the set of characteristics includes sets of words and sets of phrases.

14. The computer system of claim 9, further comprising:
  receiving the first threshold value for maintaining the first security protocol from an administrator of the storage location.

15. A computer-implemented method comprising:
  determining characteristics of a set of objects having a first sensitivity score, the characteristics including a memory size and an access frequency;
  associating, from the determined characteristics, a set of characteristics of the set of objects with the first sensitivity score;
  creating a rules database establishing links between object characteristics and security requirements, the rules database linking the set of characteristics with a set of security requirements;
  computing a revised sensitivity score for an object during modification of characteristics of the object;
  generating a current security score of a target storage location based on the revised sensitivity score of the object, wherein the object is stored in the target storage location according to a first security protocol; and
  responsive to the current security score of the target storage location exceeding a threshold value for the first security protocol, taking a security action to modify the first security protocol.

* * * * *